United States Patent [19]
Kaufman

[11] 3,713,170
[45] Jan. 23, 1973

[54] STRIP-CHART RECORDER WITH PAPER SUPPLY IN REPLACEABLE CARTRIDGE

[76] Inventor: Harry Kaufman, 44 Highridge Road, New Rochelle, N.Y. 10804

[22] Filed: Nov. 13, 1970

[21] Appl. No.: 89,419

[52] U.S. Cl. ................................. 346/136, 346/145
[51] Int. Cl. ............................................. G01d 15/28
[58] Field of Search ........................... 346/136, 145

[56] References Cited

UNITED STATES PATENTS

| | | | |
|---|---|---|---|
| 3,545,004 | 12/1970 | Alden | 346/145 X |
| 1,927,899 | 9/1933 | Mylius et al. | 346/145 |
| 1,962,311 | 6/1934 | Knobel | 346/136 X |
| 2,446,400 | 8/1948 | Woolley | 346/136 X |
| 2,520,918 | 9/1950 | Elarde | 346/136 X |
| 3,051,408 | 8/1962 | Finch | 346/145 X |
| 3,369,249 | 2/1968 | Argy et al. | 346/33 |

FOREIGN PATENTS OR APPLICATIONS

| | | | |
|---|---|---|---|
| 845,523 | 8/1960 | Great Britain | 346/136 |

Primary Examiner—Joseph W. Hartary
Attorney—Jack Oisher

[57] ABSTRACT

A strip-chart recorder having a paper supply, in roll or z-fold, housed in a replaceable cartridge for easy insertion and removal from the recorder is described. The paper drive means and writing stylus are located in the fixed parts of the recorder. The cartridge includes a back-up surface over which the paper is fed while the stylus writes on the paper. A lid which holds the cartridge in place includes an idler roller for cooperation with the paper drive means, and a cutter by means of which paper sections can be torn off.

10 Claims, 7 Drawing Figures

PATENTED JAN 23 1973 3,713,170

INVENTOR.
HARRY KAUFMAN

BY

ATTORNEY

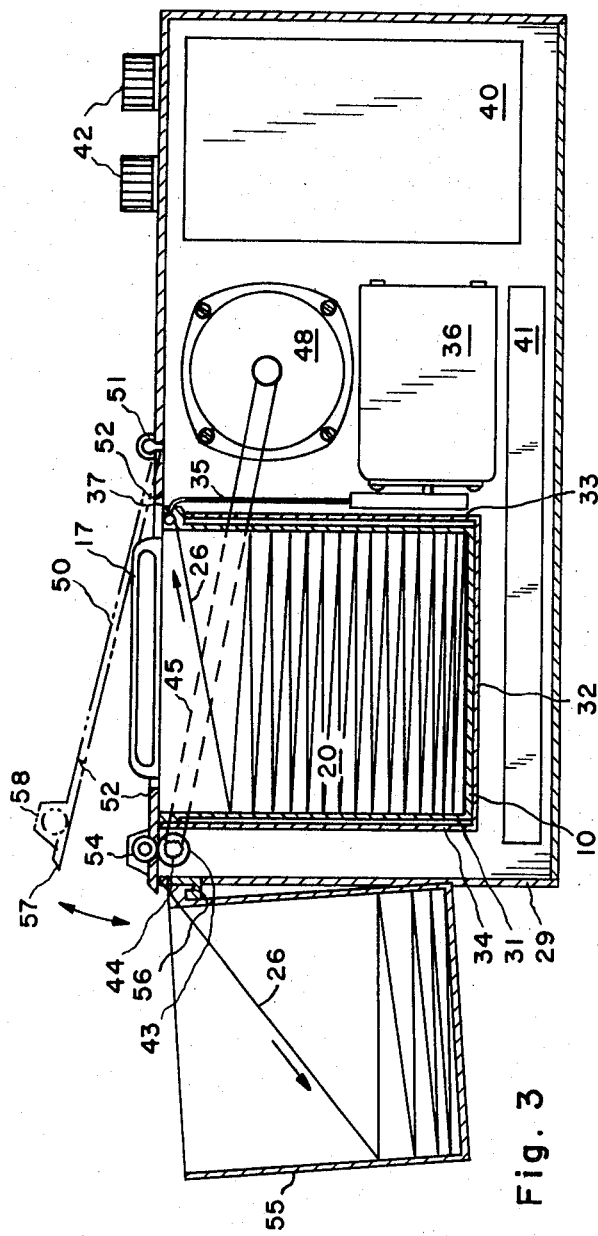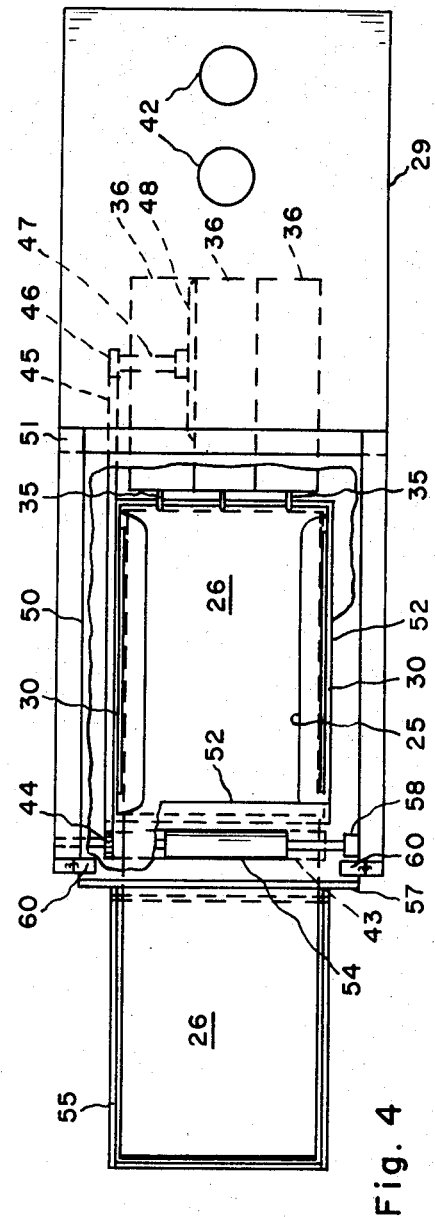

STRIP-CHART RECORDER WITH PAPER SUPPLY IN REPLACEABLE CARTRIDGE

This invention relates to a strip-chart recorder, and in particular to a strip-chart recorder of the type adapted for medical use, and to replaceable paper cartridges for use in such strip-chart recorders.

There are many kinds of strip-chart recorders presently commercially available for medical use, but so far as is known they all employ a paper supply requiring manual mounting of a roll or the like within the recorder and then careful threading of the paper end through the recorder mechanism to achieve correct positioning of the paper for subsequent automatic feeding. This is often a cumbersome and time-consuming process.

Strip threading difficulties encountered in the film camera and magnetic tape recorder fields have been solved by mounting the supply and take-up rolls or reels for the record medium in a single cartridge and moving the record medium by driving the take-up roll or reel or both it and the supply roll or reel. A similar solution is not feasible for a medical strip-chart recorder for several reasons. For one thing, there usually is no take-up roll for the paper tape. Instead, the free end of the tape must be available to permit desired sections to be torn-off from the remainder for separate study or storage. For another, the recording surface must be observable and often accessible during the writing process in order that adjustments in the machine to improve the recording can immediately be effectuated, or to enable manual markings to be added to the record medium.

The principal object of the invention is a strip-chart recorder comprising a record medium supply in replaceable cartridge form requiring only simple insertion of the cartridge without threading to prepare the recorder for use.

A further object of the invention is a replaceable cartridge containing a record medium supply for use in a medical type strip-chart recorder.

Another object of the invention is a replaceable cartridge housing a record medium supply for use in a medical type strip-chart recorder wherein the medium supply can be provided in roll or Z-fold form.

These and other objects of the invention as will appear hereinafter are achieved, in accordance with the invention, by a cartridge in the form of a simple box-like container for housing a supply of record medium and comprising adjacent the top a medium guiding surface over which the medium is drawn and adapted to back-up the medium as a writing stylus bears up against the latter during the writing process. The medium is thereafter guided over the top of the cartridge in a substantially flat plane enabling the user readily to observe the progress of the recording. The medium is driven by drive means such as a roller mounted on the recorder adjacent the cartridge and remote from the medium back-up surface. A further feature of the invention comprises mounting of an idler roller, adapted to cooperate with the drive means, in a lid which holds the cartridge in place within the recorder and through which the medium is visible as well as accessible. As still another feature, cutting means are provided on the lid for use in tearing off desired sections of the recorded medium. Further features of the invention will become apparent as the specification progresses.

The invention will now be described in greater detail with reference to the accompanying drawing wherein:

FIG. 3 is a partly cross-sectional, partly schematic view through the center of one form of a recorder of the invention containing the cartridge of FIG. 1 in position ready for recording;

FIG. 4 is a top plan view of the recorder illustrated in FIG. 3;

Figure 1:
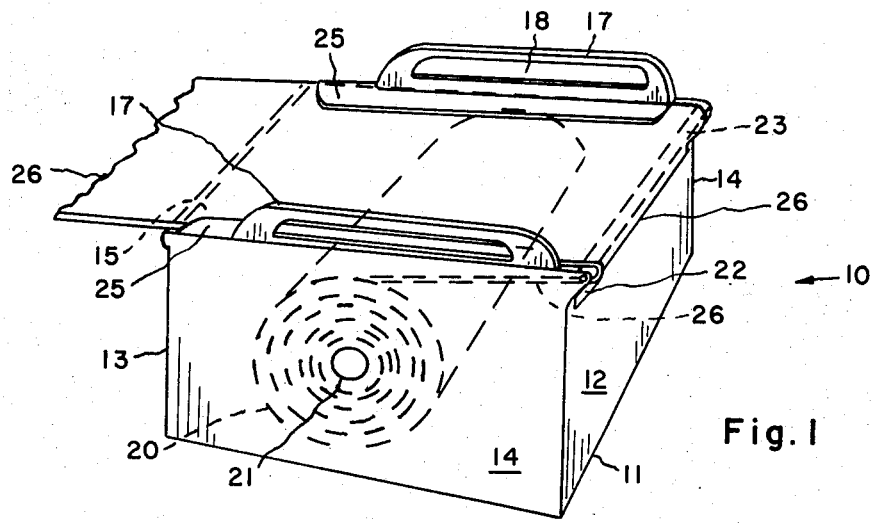
FIG. 1 is a perspective view of one form of replaceable cartridge of the invention separate from its recorder housing.

FIG. 1 is a perspective view of one form of record medium cartridge in accordance with the invention. The record medium, as is known, is a flexible strip or chart, usually of paper but which may be of any other flexible material on which a recording may be made by means of ink, pressure, or other well-known means. For convenience, a paper recording medium will be used to illustrate the invention, though other materials it will be understood are within the scope of this invention.

The cartridge of the invention, referred to generally by reference numeral 10, comprises a simple box-like container having a bottom wall 11, front 12 and rear 13 walls, side walls 14, and top wall 15. The container may be made of any suitable material though a plastic resin is preferred. The plastic resin for the wall panels may be transparent. The side panels 14 are extended upward above the container top to form opposite ears or handles 17 containing elongated apertures 18 to facilitate lifting and handling of the cartridge 10.

Figure 2:
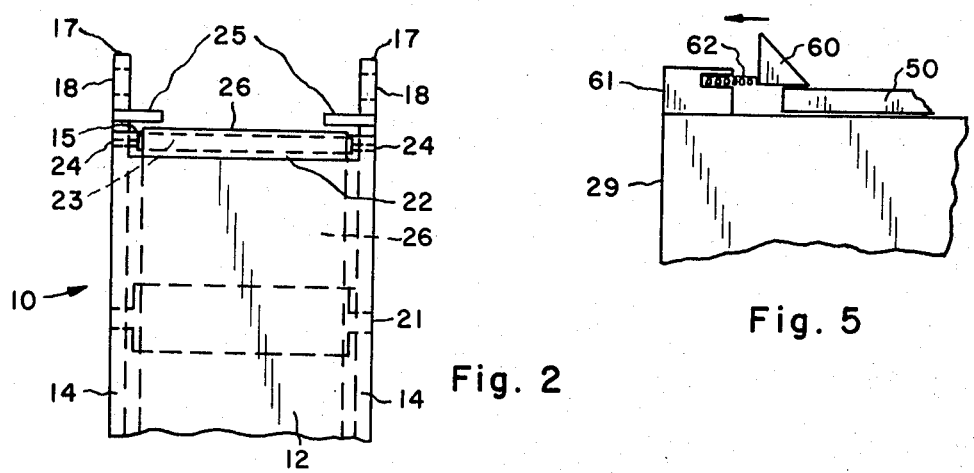
FIG. 2 is an end elevational view of the cartridge of FIG. 1.

A roll of paper 20 is located within the container below the top 15 and is journalled 21 at opposite side walls 14 for rotation within the container. The wall height of the front wall 12 is slightly shorter than the remaining walls forming a narrow horizontal slot 22 adjacent the container top 15. Mounted across the box just above the slot 22 and parallel thereto is a small diameter stylus back-up roller 23. The back-up roller 23 is journalled 24 for rotation in the upper front corner of the container in opposite side walls 14, as is illustrated in FIG. 2. The top surface of the back-up roller 23 is approximately level with the container top. Extending horizontally inward a short distance from each of the side walls 14 is a thin flat member 25 forming a pair of top paper guides. The top paper guides 25 are preferably transparent to render visible the paper strip which advances beneath it.

The path followed by the paper can be seen more clearly in FIG. 1. The free path end of the roll, designated 26, passes out of the container through the slot 22 in the front wall 12, it is bent over the back-up roller 23 so that the recording surface is uppermost, it then passes over the top 15 of the container under the top paper guides 25 through the generally horizontal slot formed by them and the box top, and it then exits from the box in a horizontal plane passing over the upper left corner remote from that where the back-up roller 23 is journalled. It will thus be seen that the paper supply is entirely self contained, and removal of the container cartridge 10 carries the paper supply 20 along with it. Further the entire top recording surface of the paper is at all times visible as it advances over the container top.

FIGS. 3 and 4 illustrate the cartridge 10 in recording position within one form of strip chart recorder in accordance with the invention. The recorder comprises an outer housing 29 comprising a compartment 31 formed by a bottom wall 32, front and rear walls 33, 34, and side walls 30. The compartment 31 has an open top and dimension adequate to accommodate the cartridge 10 such that the cartridge fits comfortably within the compartment 31 with the cartridge top approximately level with the compartment top. As will be noted, the cartridge upper right corner containing the back-up roller 23 is to the right, and adjacent thereto but located in the recorder housing 29 is a writing stylus or pen 35. The writing stylus 35 is of the conventional kind designed to mark the recording paper 26 as it passes over the backup roller 23. As will be observed, the stylus 35, shown schematically, comprises a vertically arranged arm having a writing point 37 which is positioned so as to bear against the outer recording surface of the paper as it passes over the back-up roller 23. The stylus 35 is activated by a conventional recording galvanometer 36 to which it is connected and which is mounted in the recorder housing 29.

The cross-section of FIG. 3 shows one stylus 35 and one recording galvanometer 36, conventional for many strip-chart recorders. Actually, however, there are three independent styli and activated by three recording galvanometers mounted side by side in the recorder housing, as illustrated in FIG. 4. The number of units is not critical. Three were chosen to illustrate the capability of the recorder to handle one or more recording units. Space is available within the recorder housing 29 as indicated at 40 and 41 to accommodate the usual electronics for amplifying the input electrical signals to a level capable of operating the galvanometers 36. Control knobs for the recorder are schematically illustrated at 42.

The paper 26 is driven by a drive roller 43 mounted for rotation in the fixed part of the recorder 29 adjacent the upper left-hand corner of the cartridge 10 and just underneath the paper 26 as it exits from the cartridge. The drive roller 43, which is cylindrical and arranged horizontally, is connected to a sprocket 44 which is engaged and driven by a chain drive 45. The other end of the chain 45 engages another sprocket 46 mounted on the shaft 47 of a paper drive electric motor 48 mounted in the housing 29 adjacent the opposite end of the cartridge above the recording galvanometers 36.

The cartridge 10 is held in place by a lid 50. The lid 50 is a generally flat plate hinged by a piano hinge 51 at the top of the recorder housing 29 for rotation about a horizontal axis. The lid 50 is pivotable about its hinge 51 approximately 180°. It is shown in solid lines in a closed position in FIGS. 3 and 4 and in phantom in a partially open position in FIG. 3. In the completely open position, the compartment 31 of the housing is completely exposed and the cartridge 10 may be lifted out of the compartment 31 or inserted within the compartment. In the closed position, the lid portions bordering the compartment bear on the edges of the cartridge 10 retaining it within the compartment. As has been illustrated earlier in connection with FIG. 1, the handle ears 17 are offset relative to the center of the cartridge 10, with the result that the ears 17 fit within the lid opening 52 only when the back-up roller 23 is to the right in its correct recording position. If the cartridge should be inserted backwards, with the back-up roller to the left, then the lid 50 will not close due to the inability of the ears 17 to clear the opening 52 thus indicating to the user that repositioning of the cartridge 10 is necessary for proper operation. The opening 52 in the lid not only enables ready observation of the topmost recording surface of the record paper 26 as it advances over the top of the cartridge 10, but also enables the user to mark manually the surface of the recording medium 26 during or in an interruption of the writing process.

Journalled 58 in the top surface of the lid 50 remote from the hinge 51 is an idler roller 54 having about half the length of the drive roller 43 and positioned just over the latter. When the lid 50 is closed, the idler roller 54 bears against the top surface of the paper strip 26 urging it against the drive roller 43; thus, when the motor 48 is activated, rotating the drive roller 43, the paper strip 26 is advanced from the supply in the cartridge top, and then feeds into a take-up holder or box 55 removably mounted 56, as illustrated in FIG. 3, on the upper left end of the housing 29. The left end of the lid 50 is provided with a sharp edge 57 by means of which any desired length of the paper strip 26 can be torn-off for subsequent study or storage. If not torn-off, the paper strip can be permitted to accumulate in the take-up box 55.

In FIG. 1, the paper supply was illustrated in roll form, in which case it would simply curl up in the take-up box 55. In FIG. 3, the paper supply is in Z-fold form, in which case it would accumulate in the take-up box 55 also in Z-fold form as illustrated.

Figure 5:
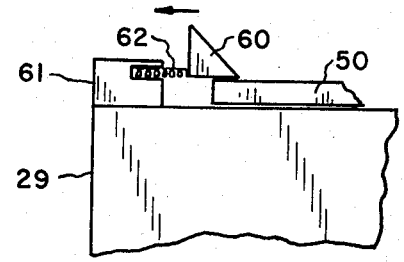
FIG. 5 is an end elevational detail view of a lock for the lid of the recorder illustrated in FIG. 4.

The lid 50 is held in its closed position by any convenient locking means. One form is illustrated in FIGS. 4 and 5 as a pair of wedge shaped members 60 mounted 61 on the housing 29 top and urged inwardly over the lid top by bias means or springs 62. When the lid 50 is closed, the wedges 60 are urged sideways until the lid is cleared and then snap backwards securing the lid in its closed position. If both wedges 60 are manually urged sideways and outwardly, the lid 50 is released and may be pivoted to its open position.

It will of course be appreciated that other arrangements of the paper drive and marking system are possible within the scope of this invention. The important requirement is that the paper supply is self contained within the removable cartridge 10, and the paperdrive and recorder mechanisms are mounted in the fixed parts of the recorder housing 29. Thus, simple insertion of the cartridge 10 with the paper pre-threaded over the back-up roller 23 and across the cartridge top underneath the guides 25 is all that is required to commence operation of the recorder, as closing of the lid 50 automatically causes engagement of the free end of the paper with drive roller 43.

Figure 7:
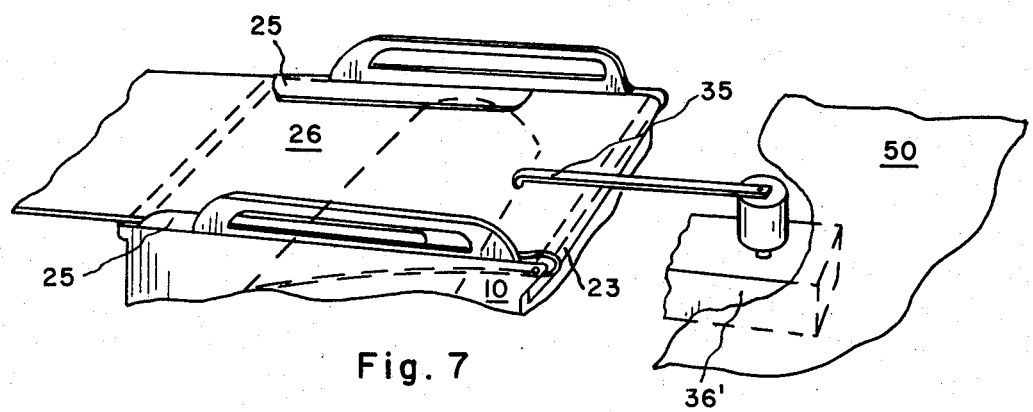
FIGS. 6 and 7 are schematic side and perspective views of a modification.
Figure 6:
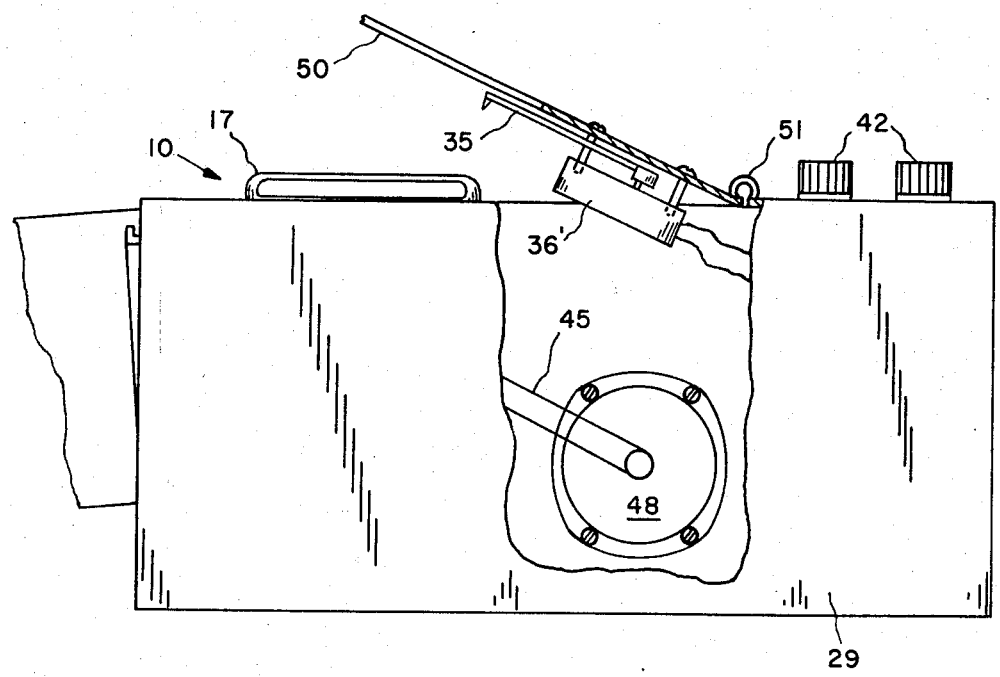

In the embodiment illustrated in FIGS. 3 and 4, the paper drive and recorder are located in the housing 25. It is also possible to mount the stylus and its driver on the lid 50, so that closing of the lid in addition to causing engagement of the paper drive means also causes engagement of the stylus with the paper surface. Opening of the lid moves the stylus out of engagement allowing ready removal of the cartridge. This is illustrated in FIGS. 6 and 7, with corresponding parts bearing the same reference numerals. In this embodiment, the paper drive motor 48 is displaced downward, leaving a space on top to accommodate the recording galvanometer or stylus pen motor drive 36', which is mounted on the lid 50 as shown. A slightly different stylus-galvanometer arrangement is present. In the lid open position, as illustrated, again the cartridge 10 is readily removed with its supply of paper. When the lid is closed, not only is the paper drive roller 43 engaged by the paper similarly to what is illustrated in FIG. 3, but also the pen 35 engages the recording surface of the paper 26 over the top panel 15 of the cartridge box, which now acts as the back-up surface for the paper during the writing process. The roller 23, still present in the cartridge, now functions merely to guide the paper from the narrow slot 22 over the top panel 15 of the box. To avoid the top paper guides 25 from interfering with the pen excursions, the guides may be shortened and thus terminate short of the right side of the cartridge. Thus the same basic cartridge is adaptable for recorders using the roller 23 or the cartridge top as the stylus back-up surface.

While the invention has been described in connection with specific embodiments, those skilled in this art will recognize that various other modifications and embodiments within the principles described are possible, and it is not intended by means of the exemplary embodiments to in any way limit the scope of the invention described except as set forth in the annexed claims.

What is claimed is:

1. A replaceable cartridge for housing only a supply of a recording medium for use in a strip-chart recorder comprising a container, said container comprising a rectangular box-like member having side and bottom walls and a top wall, a supply of flexible recording medium within the container, means on the container providing an external surface to back-up the recording medium during the recording process, said back-up surface comprising a curved member extending horizontally across the box and located in an upper corner at one side of the box and substantially level with its top wall, first means on the container for guiding the recording medium from within the container over the back-up surface, and second means on the container for guiding the recording medium from the back-up surface over the top wall of the container whereby the same is visible and accessible, said container being free of any permanent physical connection to marking means or drive means for the recording medium whereby it constitutes a self-contained unit completely separable from the recorder proper.

2. A cartridge as set forth in claim 1 wherein the first medium guiding means comprises wall portions defining a narrow slot extending horizontally beneath the back-up surface, said slot and back-up surface being dimensioned such that the recording medium can pass from the supply on the interior through the slot outside of the container and thence over the back-up surface and thence in a horizontal plane across and over the top wall of the box to exit from the box at the box side opposite to said one side.

3. A cartridge as set forth in claim 2 wherein the second guide means comprises horizontal members extending inward from the box walls to define with the box top wall a horizontal slot for passage of the recording medium across and over the box top.

4. A cartridge as set forth in claim 3 wherein the back-up surface comprises a roller journalled in the box walls, and handle means are provided on the container, said handle means comprising two upwardly-extending ear extensions of the walls each adjacent one of the horizontal members of the second guide means, said ear extensions being offset from the center between the one and the opposite sides of the container.

5. A strip-chart recorder comprising a housing having a top defining a rectangular recessed area, a cartridge removably seated within the recessed area and comprising a rectangular box-like container having a top surface, said cartridge being free of any permanent physical connection to the recorder housing, means in an upper corner of one side of the container providing an external surface to back-up a recording medium, said back-up surface being substantially level with the container top surface, a supply of flexible recording medium within the container, first means in the container for guiding the recording medium from within the container over the back-up surface, second means on the container for guiding the recording medium from the back-up surface over the container top surface to exit from the container from the side opposite to its one side and in a substantially horizontal plane, drive means for the recording medium, said drive means comprising movable means mounted in the recorder housing adjacent its top for engaging the underside of the recording medium and advancing same from the supply, over the back-up surface and through the exit, a lid member mounted on the recorder housing so as to extend over the cartridge, said lid having an opening directly overlying the cartridge top making accessible from the outside the topside of the recording medium as it passes over the cartridge top, and marking means mounted in the recorder housing for engaging and marking the recording medium as it passes over the back-up surface.

6. A strip-chart recorder as claimed in claim 5 wherein the drive means movable means comprises a horizontally-extending roller located adjacent the opposite side of the cartridge container and adjacent the recording medium exit, the lid comprises an idler roller, and means are provided for mounting of the lid on the recorder housing such that it is movable from an open position wherein the recessed area accommodating the cartridge is exposed enabling removal or insertion of the cartridge, to a closed position wherein the lid closes over the cartridge and the lid idler roller engages the top side of the recording medium at a position overlying the drive means roller.

7. A strip-chart recorder as set forth in claim 6 and further comprising releasable locking means on the recorder housing for locking the lid in its closed position, and recording medium take-up means removably mounted on the recorder housing adjacent the cartridge exit.

8. A strip-chart recorder as claimed in claim 6 wherein the lid end adjacent the cartridge exit extends beyond the drive means roller, means are provided on the said lid end for severing of the recording medium, a recording galvanometer is mounted within the recorder housing adjacent the cartridge recessed area and is coupled to the marking means, the marking means comprises a stylus coupled to the galvanometer and having a writing end engaging the paper as it passes over the back-up surface, and a motor for activating the drive means roller is mounted in the recorder housing adjacent the recorder galvanometer.

9. A strip-chart recorder as set forth in claim 6 wherein the cartridge container comprises two upwardly extending ear extensions, said ear extensions being offset from the center of the container and being positioned to extend through the lid opening only when the cartridge is seated in its operative position within the recessed area.

10. A strip-chart recorder as claimed in claim 5 wherein the recording galvanometer is mounted on the lid with the marking means positioned to engage the paper as it passes over the top surface of the cartridge.

* * * * *